United States Patent [19]

Wojtowicz

[11] 3,888,856
[45] June 10, 1975

[54] PREPARATION OF ALKALI METAL SALTS OF DICHLOROISOCYANURIC ACID

[75] Inventor: John A. Wojtowicz, Cheshire, Conn.

[73] Assignee: Olin Corporation, New Haven, Conn.

[22] Filed: Sept. 4, 1974

[21] Appl. No.: 503,213

[52] U.S. Cl. ........................ 260/248 C; 252/187 C
[51] Int. Cl. ............................................. C07d 55/40
[58] Field of Search ................................. 260/248 C

[56] References Cited
UNITED STATES PATENTS
3,415,823  12/1968  Moore et al. ........................ 260/248

Primary Examiner—John M. Ford
Attorney, Agent, or Firm—Donald F. Clements; T. P. O'Day; J. B. Haglind

[57] ABSTRACT

Alkali metal salts of dichloroisocyanuric acid are produced by the reaction of trichloroisocyanuric acid with an alkali metal salt of an inorganic acid or aliphatic carboxylic acid in the presence of water. Suitable inorganic acids include cyanic acid, thiocyanic acid, hydrocyanic acid, nitrous acid, boric acid, chlorous acid, silicic acid and aluminic acid. Aliphatic carboxylic acids which may be used are, for example, aliphatic monocarboxylic acids having one to about six carbon atoms and aliphatic polycarboxylic acids having two to about six carbon atoms and their hydroxy-substituted derivatives.

When sodium or lithium salts are used, the reaction product is sodium or lithium dichloroisocyanurate dihydrate while potassium salts react to produce [(monotrichloro) tetra (potassium dichloro)] pentaisocyanurate.

The products are useful as bleaching or sanitizing agents.

21 Claims, No Drawings

PREPARATION OF ALKALI METAL SALTS OF DICHLOROISOCYANURIC ACID

This invention relates to a process for the production of alkali metal salts of dichloroisocyanuric acid. The salts are well known products used in washing, bleaching and sanitizing applications.

It is known to produce alkali metal salts of dichloroisocyanuric acid by reacting trichloroisocyanuric acid with a salt of cyanuric acid. For example, in U.S. Pat. No. 3,035,057, issued on May 15, 1962, to W. F. Symes and N. S. Hadzekyriakides, 2 moles of trichloroisocyanuric acid are reacted with a mole of trisodium or tripotassium isocyanurate at a temperature range of 0° to 60°C. and a pH of 5.0 to 8.5. In U.S. Pat. No. 3,150,132, issued on Sept. 22, 1964, to W. Symes, trichloroisocyanuric is reacted with monopotassium dichloroisocyanurate to form a [(monotrichloro) tetra (monopotassium dichloro)] pentaisocyanurate. The molar ratio of monopotassium isocyanurate to trichloroisocyanuric acid is in excess of 4:1 and more preferably between 6:1 and 8:1. The temperature range of the reaction was in the range of 5° C. to 50° C. and the pH was maintained below 6.0 and preferably less than 2.1.

The above processes require as one reactant, a salt of a relatively expensive organic heterocyclic acid, cyanuric acid. The cyanuric salt is prepared by the reaction of cyanuric acid with a base such as sodium or potassium hydroxide under controlled temperature and pH conditions. The reaction with trichloroisocyanuric acid requires similarly controlled pH conditions.

An object of the present invention is to provide a novel process for preparing alkali metal salts of dichloroisocyanuric acid using inexpensive alkali metal salts of inorganic acids.

Another object of the present invention is to provide a novel process for preparing alkali metal salts of dichloroisocyanuric using inexpensive alkali metal salts of aliphatic monocarboxylic and polycarboxylic acids.

These and other objects of the invention will be apparent from the following detailed description of the invention.

Briefly, the process of the present invention for producing alkali metal salts of dichloroisocyanuric acid comprises reacting trichloroisocyanuric acid with an alkali metal salt of an acid selected from the group consisting of:

1. inorganic acids selected from the group consisting of cyanic acid, thiocyanic acid, hydrocyanic acid, nitrous acid, chlorous acid, silicic acid, aluminic acid and boric acid,
2. aliphatic carboxylic acids selected from the group consisting of aliphatic monocarboxylic acids and hydroxy-substituted aliphatic monocarboxylic acids wherein said aliphatic group contains from one to about six carbon atoms and aliphatic polycarboxylic acids and hydroxy-substituted aliphatic polycarboxylic acids wherein said aliphatic group contains from two to about six carbon atoms, said reaction being conducted in the presence of water, and recovering said alkali metal salt of dichloroisocyanuric acid produced thereby.

More in detail, one of the reactants employed in the process of the present invention is an alkali metal salt of an acid. The acid is selected from the group consisting of inorganic acids and aliphatic organic acids.

Suitable inorganic acids include cyanic acid, thiocyanic acid, hydrocyanic acid, nitrous acid, chlorous acid, silicic acid, aluminic acid and boric acid. Preferably cyanic acid, hydrocyanic acid, nitrous acid, chlorous acid, silicic acid, aluminic acid and boric acid are employed.

Typical examples of suitable alkali metal salts of inorganic acids include sodium cyanate, sodium thiocyanate, sodium cyanide, sodium nitrite, sodium chlorite, sodium silicate, sodium aluminite and sodium tetraborate. The corresponding potassium, lithium, cesium and rubidium salts may also be employed. The more preferred alkali metal salts are the sodium and potassium salts of chlorous acid, boric acid, and cyanic acid.

Aliphatic carboxylic acid which can be used include monocarboxylic acids and hydroxy substituted monocarboxylic acids having from one to about six carbon atoms in the aliphatic group, and polycarboxylic acids and hydroxy substituted polycarboxylic acids having from two to about six carbon atoms.

Typical examples of suitable monocarboylic acids include formic acid, acetic acid, propanoic acid, butyric acid, pentanoic or valeric acid, and hexanoic or caproic acid. Suitable hydroxy-substituted monocarboxylic acids include glycolic acid, lactic or 2-hydroxypropanoic acid, hydroxy butyric acid, hydroxy valeric acid, and hydroxy caproic acid.

Typical examples of suitable alkali metals salts of mono-carboxylic acids and hydroxy-substituted monocarboxylic acids include sodium formate, sodium acetate, sodium propionate, sodium butyrate, sodium valerate, sodium caproate, sodium glycolate, sodium lactate, sodium hydroxy butyrate, sodium hydroxy valerate, and sodium hydroxy caproate. The corresponding potassium, lithium, rubidium and cesium salts of monocarboxylic acids and hydroxy-substituted monocarboxylic acids may also be employed with the sodium and potassium salts being preferred.

In addition, it is preferred to employ aliphatic monocarboxylic acids and hydroxy-substituted aliphatic monocarboxylic acids having from one to about four carbon atoms in the aliphatic group.

Suitable aliphatic polycarboxylic acids and hydroxy substituted aliphatic polycarboxylic acids are those having from two to about six carbon atoms in the aliphatic group. Typical examples are oxalic acid, malonic acid, succinic acid, glutaric acid, adipic acid, tartronic or hydroxy-malonic acid, tartaric acid, hydroxy glutaric acid, and citric acid.

Typical examples of suitable alkali metal salts of the aliphatic polycarboxylic acids and hydroxy-substituted aliphatic polycarboxylic acids include sodium oxalate, sodium malonate, sodium succinate, sodium glutarate, sodium tartronate, sodium tartrate, sodium hydroxy glutarate and sodium citrate. The corresponding potassium, lithium, rubidium and cesium salts of aliphatic polycarboxylic acids and hydroxy-substituted aliphatic polycarboxylic acids may also be employed with the corresponding sodium and potassium salts being preferred. In addition, it is preferred to employ polycarboxylic acids and hydroxy-substituted polycarboxylic acids having two or three carboxylic acid groups.

When reacted, the alkali metal salt of the acid may be added, for example, as a dry solid, a wet solid or as an aqueous solution of the alkali metal salt.

The second reactant in the process of this invention is trichloroisocyanuric acid, which may be reacted as a dry solid, wet solid or as an aqueous slurry.

The reaction is carried out using a molar ratio of trichloroisocyanuric acid to the alkali metal component of the alkali metal salt in the range from about 1:0.6 to about 1:2, and preferably from about 1:0.8 to about 1:1.2.

Any suitable reaction temperature may be used, for example, a temperature in the range from about 0° to about 50° C., and preferably from about 20° to about 40°C.

During the reaction, trichloroisocyanuric acid reacts with the alkali metal portion of the alkali metal salt to form an alkali metal salt of dichloroisocyanuric acid. Where the alkali metal reacted is, for example, sodium or lithium, the product obtained at temperatures in the range of, for example, from about 0° to about 50° C., is a simple salt, e.g., sodium dichloroisocyanurate dihydrate or lithium dichloroisocyanurate dihydrate. By heating the dihydrate or maintaining the reaction at the appropriate temperature, the anhydrous salt or monohydrate, where existent, may be obtained. For example, by heating sodium dichloroisocyanurate dihydrate at temperatures of from about 60° to about 90° C., sodium dichloroisocyanurate monohydrate is obtained. At temperatures above about 90° C., anhydrous sodium dichloroisocyanurate is produced.

When the alkali metal portion of the alkali metal salt is potassium, the product formed at temperatures of from about 0° to about 50° C. is a complex salt having one mole of trichloroisocyanuric acid and four moles of potassium dichloroisocyanurate. The product is identified as [(monotrichloro) tetra (monopotassium dichloro)] pentaisocyanurate.

When reacting trichloroisocyanuric acid with sodium acetate, the reaction is believed to proceed according to the following equation:

$$Cl_3CA + CH_3COONa + 3H_2O \rightarrow NaCl_2CA \cdot 2H_2O + HOCl + CH_3COOH \quad (1)$$

where CA represents cyanuric acid.

If potassium oxalate is the alkali metal acid salt, the reaction with trichloroisocyanuric acid is believed to proceed as follows:

$$5Cl_3CA + 2K_2C_2O_4 + 4H_2O \rightarrow Cl_3CA \cdot 4KCl_2CA + 4HOCl + 2(HOOC)_2 \quad (2)$$

$$4HOCl + 2(HOOC)_2 \rightarrow 4CO_2 + 4H_2O + 2Cl_2 \quad (3)$$

The overall reaction is expressed by the equation:

$$5Cl_3CA + 2K_2C_2O_4 \rightarrow Cl_3CA \cdot 4KCl_2Ca + 4CO_2 + 2Cl_2 \quad (4)$$

In the above reactions, the acid portion of the alkali metal salts is decomposed to a gaseous product, carbon dioxide, and the chlorine released from trichloroisocyanuric acid is evolved as a chlorine-containing gas e.g., $Cl_2$ or $HOCl$.

Similar reactions occur when the alkali metal salt is that of cyanic acid, hydrocyanic acid or chlorous acid.

Alkali metal salts of acids such as acetic acid react with trichloroisocyanuric acid at temperatures of from about 0° to about 50° C. to form an alkali metal salt of dichloroisocyanuric acid mixed with the acid. The reaction with lithium acetate is believed to proceed as follows:

$$Cl_3CA + LiOOCCH_3 + 3H_2O \rightarrow LiCl_2CA \cdot 2H_2O + HOCl + CH_3COOH \quad (5)$$

The hypochlorous acid formed volatilizes during the reaction. Heating, for example, the lithium dichloroisocyanuric acid dihydrate mixed with acetic acid to produce anhydrous lithium dichloroisocyanurate will volatilize the acetic acid present.

Other alkali metal salts of acids such as nitrous acid form mixtures of the alkali metal salt of dichloroisocyanuric acid with an impurity in the form of a salt, for example, sodium nitrate. These salts are not volatilized while heating to dry the product or to dehydrate it to the anhydrous form. For example, where the acid portion is more soluble in a solvent such as water than the alkali metal salt of dichloroisocyanuric, the alkali metal salt of dichloroisocyanuric acid may be freed of the acid impurity by adding the mixed product to a minimum amount of water to dissolve the impurity, filtering off the solution and drying or heating the filter cake to recover the purified alkali metal salt of dichloroisocyanuric acid.

Where the acid portion mixed with the alkali metal salt of dichloroisocyanuric is less soluble in a solvent such as water than the alkali metal dichloroisocyanurate, the mixed product may be dissolved in water and the solution containing the alkali metal dichloroisocyanurate separated from the insoluble acid. Separation of the insoluble acid is effected by filtration, centrifuging, or the like and the resulting classified solution is evaporated and cooled to effect crystallization of the alkali metal salt of dichloroisocyanuric acid. The resulting crystals are then separated in a similar manner, and may be washed with cold water, filtered and dried. An alkali metal salt of dichloroisocyanuric containing, for example, citric acid may be purified in this manner.

Water in an amount sufficient to at least moisten the reactants should be present. As shown in Equations (1) and (4) above, water is believed to initially react with trichloroisocyanuric acid to form hypochlorous acid. Where the alkali metal dichloroisocyanurate formed is the anhydrous salt, as is the case when potassium is the alkali metal reacted, the water serves as a catalyst and as shown in Equation (3) is reformed during the course of the reaction. Where, however, the alkali metal dichloroisocyanurate produced is in the form of a hydrate, as shown in Equation (1), sufficient water should be present to supply the water of hydration. A suitable amount of water is a molar ratio of trichloroisocyanuric to water of from about 1:1 to about 1:15, and preferably from about 1:2 to about 1:10. Where less water is used, the reaction is incomplete and the product obtained is a mixture of unreacted trichloroisocyanuric acid and the alkali metal salt of dichloroisocyanuric acid. Greater amounts of water may be used, if desired, but are not required.

Agitation of the reaction mixture is desirable during the reaction period to assure admixture of trichloroisocyanuric acid with the alkali metal chloride and the water present and the release of any gases formed.

Reaction time is not critical and control or adjustment of the pH during the reaction is not required.

During a reaction, where a chlorine-containing gas such as chlorine or hypochlorous acid is released, the chlorine may be recovered, for example, by feeding the gas to a scrubber containing an alkali metal hydroxide or alkali metal carbonate to form an alkali metal hypochlorite; or by reacting the chlorine-containing gas with cyanuric acid or a salt thereof to be used in the production of trichloroisocyanuric acid.

The following examples are presented to further illustrate the invention without any intention of being limited thereby. All parts and percentages are by weight unless otherwise specified. In the examples the abbreviation CA represents cyanuric acid.

EXAMPLE 1

SODIUM ACETATE

Trichloroisocyanuric acid (23.24g, 0.10 mol) was added to a crystallizing dish containing 0.10 mol of dry sodium acetate. The materials were thoroughly mixed and 5.0 mls. of $H_2O$ (0.25 mols) added while the mixture was continuously stirred. During the reaction, the odor of hypochlorous acid was noticeable. The reaction mixture was stirred occasionally during the reaction period and then allowed to set overnight. The product was dried in a forced-draft oven at 100° C. for 1 hour and was identified as anhydrous sodium dichloroisocyanurate by infrared spectrum analysis. The yield, based on trichloroisocyanuric acid, was 22.34g (95 percent of theory). The available chlorine content was 60.5 percent.

EXAMPLE 2

POTASSIUM OXALATE

Trichloroisocyanuric acid (23.24g, 0.10 mol) was placed in a crystallizing dish containing 7.37g (0.04 mol) of potassium oxalate. Water (9.0 ml., 0.50 mol) was added and the mixture stirred briefly. After allowing the mixture to set overnight, the product was dried in a forced-draft oven at 100° C. for 1 hour. The product having an available chlorine content of 66.9 percent, was idenfitied as [(monotrichloro) tetra (potassium dichloro)] pentaisocyanurate by comparison of the infrared spectrum with that of a sample of [(monotrichloro) tetra (monopotassium dichloro)] pentaisocyanurate obtained commercially. Yield: 100 percent of theory based on $Cl_3CA$.

EXAMPLE 3

SODIUM NITRITE

To 23.24g (0.10 mol) of trichloroisocyanuric acid in a crystallizing dish, a solution of 6.9g (0.10 mol) of sodium nitrite in 15 mls. (0.83 mol) of water was added. The mixture was stirred and brown fumes were evolved during the reaction. After setting overnight and drying for 1 hour at 100° C. a product was obtained which was identified as a mixture of sodium dichloroisocyanurate and sodium nitrate having an available chlorine content of 47 percent. The yield of sodium dichloroisocyanurate was 24.44g (81 percent of theory based on $Cl_3CA$).

EXAMPLE 4

SODIUM CHLORITE

A slurry of trichloroisocyanuric acid (2.32g, 0.01 mol) in 5 mls. of water was admixed with 0.91g (0.01 mol) of dry sodium chlorite. A vigorous reaction occurred in which a chlorine containing gas was evolved. The product was heated in a force draft oven at 100° C. for about 1 hour and sodium dichloroisocyanurate was obtained in 97 percent yield (based on trichloroisocyanuric acid) having an available chlorine content of 60.9 percent.

EXAMPLES 5–8

The procedure of Example 1 was repeated using sodium oxalate, sodium tetraborate decahydrate, sodium aluminate and sodium silicate in place of sodium acetate. The amount of reactants, product and yield are recorded in Table 1 below as Examples 5 through 8, respectively.

EXAMPLE 11

The procedure of Example 2 was repeated employing potassium acetate instead of potassium oxalate. Results for Example 9 are given in Table 1 below.

EXAMPLES 10–14

The procedure of Example 3 was repeated using sodium cyanate, sodium cyanide, sodium citrate, sodium formate and sodium succinate, in place of sodium nitrite. The results are recorded as Examples 10 through 14, respectively, in Table 1 below.

Table 1

Production of Alkali Metal Salts of Dichloroisocyanuric Acid By the Reaction of Trichloroisocyanuric Acid with an Alkali Metal Salt of An Inorganic or Aliphatic Organic Acid

| Example No. | Alkali Metal Salt | Mols | $Cl_3CA$ Mols | $H_2O$ Mols | Product | Percent Yield | Percent Available Chlorine |
|---|---|---|---|---|---|---|---|
| 5 | Sodium oxalate | 0.05 | 0.10 | 0.25 | $NaCl_2CA$ | 92 | 59.9 |
| 6 | Sodium tetraborate decahydrate | 0.05 | 0.10 | 0.25 | $NaCl_2CA$ | 98 | 40.8 |
| 7 | Sodium aluminate trihydrate | 0.05 | 0.10 | 0.83 | $NaCl_2CA$ | 82 | 48.7 |
| 8 | Sodium silicate nonahydrate | 0.05 | 0.10 | 0.83 | $NaCl_2CA$ | 82 | 42.8 |
| 9 | Potassium acetate | 0.10 | 0.125 | 0.25 | $Cl_3CA.4KCl_2CA$ | 96 | 64.5 |
| 10 | Sodium cyanate | 0.10 | 0.10 | 0.25 | $NaCl_2CA$ | 87 | 54.1 |
| 11 | Sodium cyanide | 0.10 | 0.10 | 0.25 | $NaCl_2CA$ | 78 | 51.4 |
| 12 | Sodium citrate | 0.0333 | 0.10 | 0.61 | $NaCl_2CA$ | 50 | 30.9 |
| 13 | Sodium formate | 0.10 | 0.10 | 0.83 | $NaCl_2CA$ | 67 | 44.8 |
| 14 | Sodium succinate | 0.05 | 0.10 | 0.77 | $NaCl_2CA$ | 90 | 50.2 |

What is claimed is:

1. A process for preparing an alkali metal salt of dichloroisocyanuric acid which comprises reacting trichloroisocyanuric acid with an alkali metal salt of an acid selected from the group consisting of:

1. inorganic acids selected from the group consisting of cyanic acid, thiocyanic acid, hydrocyanic acid, nitrous acid, chlorous acid, silicic acid, aluminic acid, and boric acid,
2. aliphatic carboxylic acids selected from the group consisting of aliphatic monocarboxylic acids and hydroxy-substituted aliphatic monocarboxylic acids wherein said aliphatic group contains from one to about six carbon atoms, and aliphatic polycarboxylic acids and hydroxy-substituted aliphatic polycarboxylic acids wherein said aliphatic group contains from two to about six carbon atoms, said reaction being conducted in the presence of water, and recovering said alkali metal salt of dichloroisocyanuric acid produced thereby.

2. The process of claim 1 in which the molar ratio of said trichloroisocyanuric acid to the alkali metal component of said alkali metal salt is from about 1:0.6 to about 1:2.

3. The process of claim 2 in which the reaction temperature is in the range from about 0° C. to about 50° C.

4. The process of claim 3 in which said alkali metal is selected from the group consisting of sodium and potassium.

5. The process of claim 4 in which said alkali metal is sodium and said alkali metal salt of dichloroisocyanuric acid is sodium dichloroisocyanurate dihydrate.

6. The process of claim 4 in which said alkali metal is potassium and said alkali metal salt of dichloroisocyanuric acid is [(monotrichloro) tetra (monopotassium dichloro)] pentaisocyanurate.

7. The process of claim 4 in which said water is present in a molar ratio of said trichloroisocyanuric acid to said water of from about 1:1 to about 1:15.

8. The process of claim 7 in which the molar ratio of said trichloroisocyanuric acid to said alkali metal is from about 1:0.8 to about 1:1.2 and said reaction temperature is from about 20° to about 40° C.

9. The process of claim 8 in which said water is present in a molar ratio of said trichloroisocyanuric acid to said water of from about 1:2 to about 1:10.

10. The process of claim 9 in which said inorganic acid is hydrocyanic acid.

11. The process of claim 9 in which said inorganic acid is boric acid.

12. The process of claim 9 in which said inorganic acid is nitrous acid.

13. The process of claim 9 in which said inorganic acid is chlorous acid.

14. The process of claim 9 in which said inorganic acid is silicic acid.

15. The process of claim 9 in which said inorganic acid is aluminic acid.

16. The process of claim 9 in which said inorganic acid is cyanic acid.

17. The process of claim 9 in which said aliphatic carboxylic acid is formic acid.

18. The process of claim 9 in which said aliphatic carboxylic acid is acetic acid.

19. The process of claim 9 in which said aliphatic carboxylic acid is oxalic acid.

20. The process of claim 9 in which said aliphatic carboxylic acid is succinic acid.

21. The process of claim 9 in which said aliphatic carboxylic acid is citric acid.

* * * * *